Jan. 25, 1955
J. R. BIRD
2,700,749
RESISTOR FOR HIGH-FREQUENCY ELECTRICAL TRANSMISSION LINES
Filed Oct. 24, 1950
2 Sheets-Sheet 1
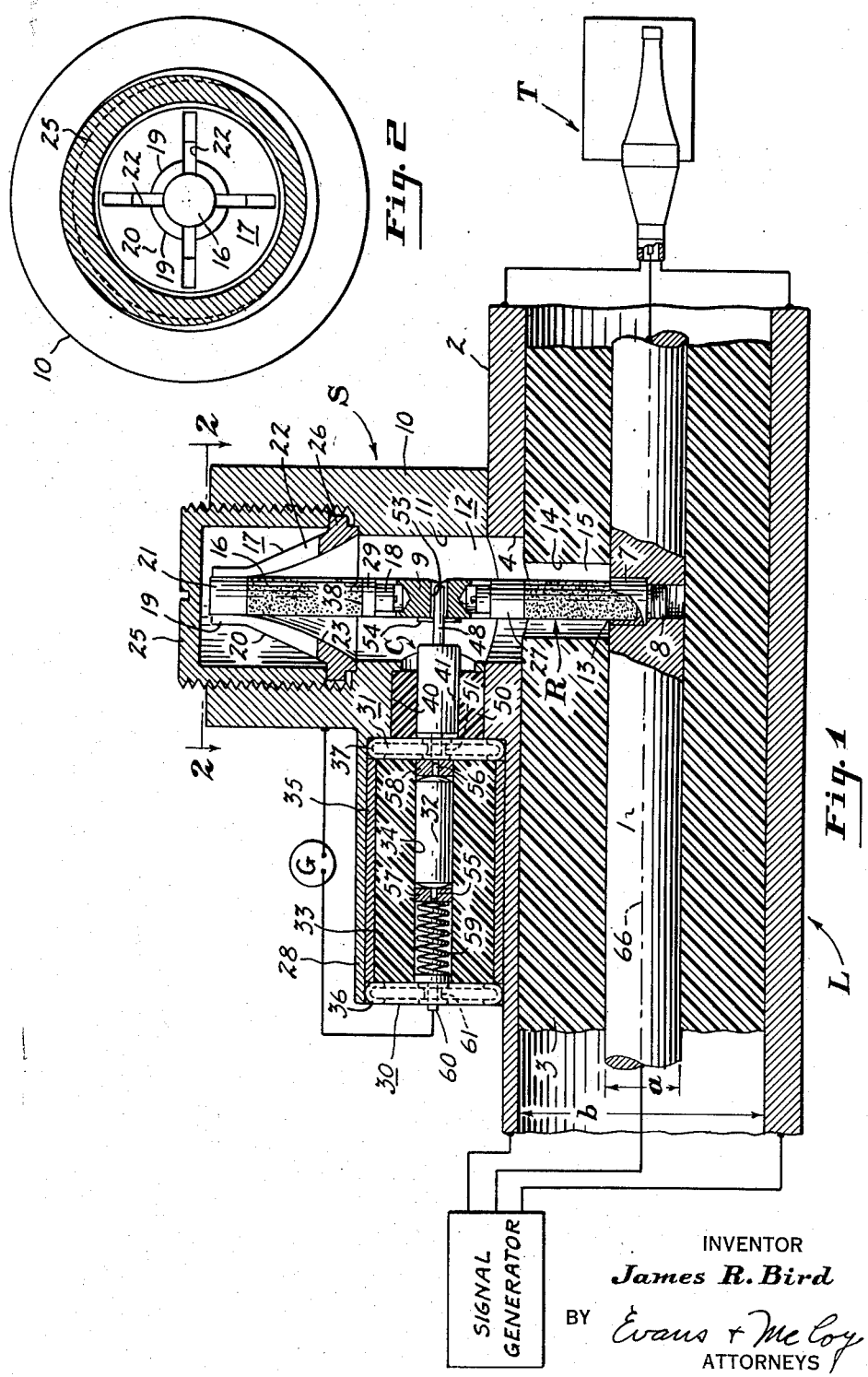
INVENTOR
*James R. Bird*
BY *Evans + McCoy*
ATTORNEYS

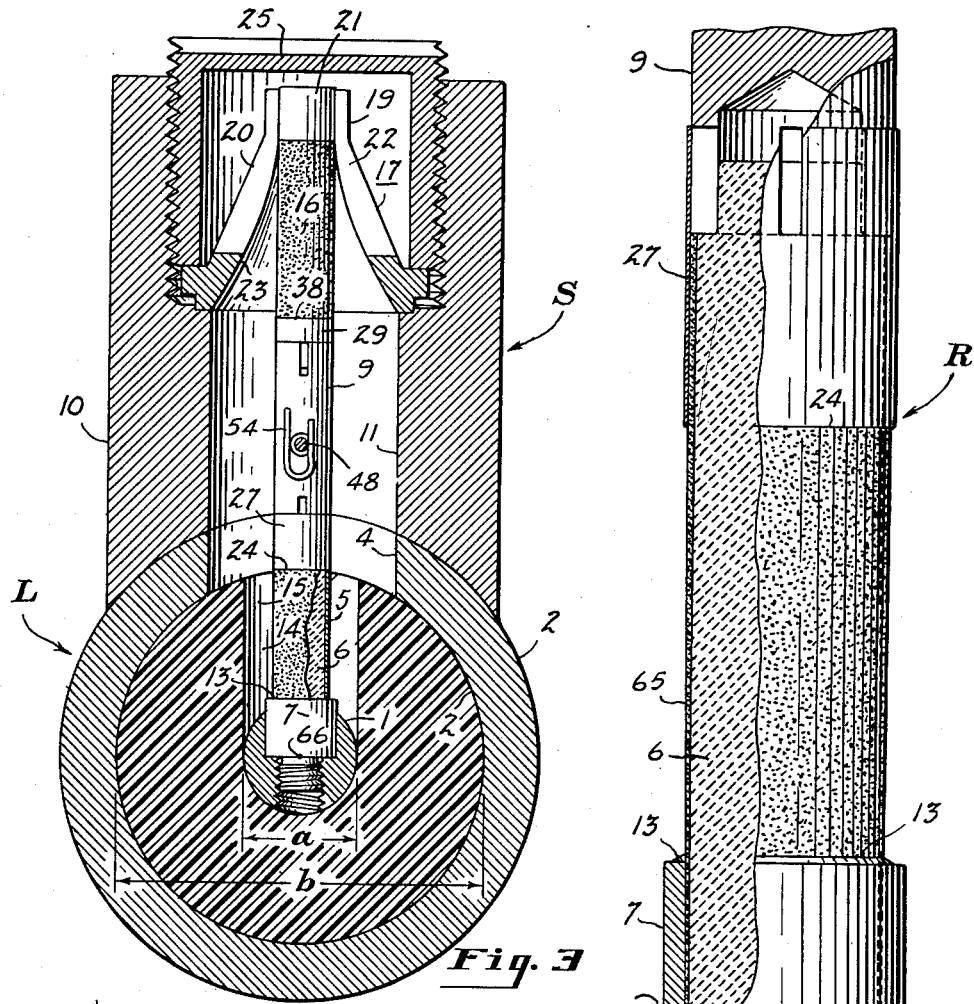
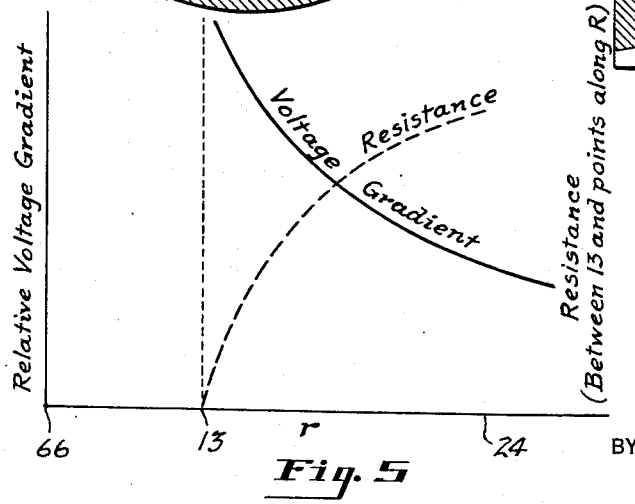

United States Patent Office 2,700,749
Patented Jan. 25, 1955

2,700,749

RESISTOR FOR HIGH-FREQUENCY ELECTRICAL TRANSMISSION LINES

James R. Bird, Chagrin Falls, Ohio

Application October 24, 1950, Serial No. 191,805

12 Claims. (Cl. 324—95)

This invention relates to high frequency electrical systems and more particularly to the sampling of high frequency energy transmitted along a coaxial line. High frequency electrical circuits often require devices capable of measuring the magnitude of traveling waves. The principle of voltage division has been employed in such measurements both to isolate the measuring circuit from the transmission line, thereby reducing impedance disturbances, and to obtain relatively low, more convenient voltages to work with, where high voltages exist on the main line. It is a common arrangement in voltmeters, wattmeters, and reflectometers to connect the measuring circuit across the transmission line in various ways as by means of a small coupling capacitance. Devices of this type have not been entirely satisfactory for reasons such as the changes and variations in characteristics which result from changes in operating frequencies or frequency ranges.

It is therefore one of the principal objects of the present invention to provide improvements in means for making a side branch or tap connection with a high frequency transmission line which permits sampling transmitted energy without objectionably interfering with the transmission. More specifically, it is sought to provide means primarily of resistive character for connecting a device such as a receiver or a measuring instrument to a high frequency transmission line of the coaxial type in such manner that the transmission line energy is sampled without causing reflections or other objectionable effects in the main transmission line. In accordance with the principles of the invention the several components of the system are so arranged in combination that a sampling current is obtained which is relatively low and is proportional to the prevailing transmission line voltage, or substantially so.

Another object is to provide a voltage divider for use in high frequency circuits which maintains a substantially constant division ratio over a wide frequency band.

Another object is to provide a voltage dividing circuit of the character employing series resistors for use in conjunction with a high frequency transmission line, the components of the voltage dividing circuit being so positioned and arranged that reactances are neutralized and a pure resistance, constant over a wide frequency range, is obtained.

Another object concerned with the broader aspects of the invention is to provide a series bridging resistor for use in combination with a coaxial transmission line, the resistor being disposed in the electrostatic field of the transmission line and being so formed or constructed and so connected that, in operation, the potential gradient as measured at different points along the length of the resistor substantially equals or approximates the potential gradient of the electrostatic field of the transmission line. This aspect of the invention is particularly concerned with the provision of a circuit in which a resistor forming a connection between the center conductors of main and side branch lines is positioned in the space that separates the inner and outer conductors of the main coaxial line. The resistor bridges or extends across such space, preferably radially, so as to be subjected to the electrostatic field that exists in the dielectric space between the coaxial line conductors during the transmission of high frequency current by the line. Furthermore, the resistor is of high order, being at least several times the impedance of the main transmission line.

In connecting the bridging resistor, say to a measuring instrument, an auxiliary coaxial circuit or line is employed, the center conductor of the auxiliary line being connected to the resistor and the outer conductor of the auxiliary coaxial line being connected to the outer conductor of the transmission line. A preferential arrangement, by way of example, is one in which the auxiliary coaxial circuit or line is non-reflectively terminated and is tapped intermediate its ends for connection thereto of a device such as a measuring instrument. The non-reflecting termination of the auxiliary coaxial line may incorporate a resistive element which, with the bridging resistor in the charged field of the transmission line, constitute a pair of series connected resistors dividing the voltage across the transmission line in direct ratio to their respective resistances. Other arrangements will readily present themselves, the resistor of the present invention connected across the transmission line conductors in bridging relation being useful in other types of circuits.

Further objects and advantages relate to certain combinations and arrangements of parts and have to do with the provision of a simple and economical relatively high resistance voltage sampling device of general utility in high frequency circuits. These and other objects will become apparent from the following detailed description of the invention made in connection with the accompanying drawings forming part of the specification.

In the drawings:

Figure 1 is a combined diagram and fragmentary sectional view taken longitudinally through a coaxial transmission line and through a voltage sampling or dividing device attached to such line embodying the bridging resistor and illustrating the principles of the present invention;

Fig. 2 is a fragmentary sectional detail with parts removed, taken substantially along the line indicated at 2—2 of Fig. 1 and enlarged with respect to that figure;

Fig. 3 is a sectional view, with parts broken away and removed, taken transversely through the main coaxial transmission line and longitudinally through the auxiliary coaxial line, this view being enlarged with respect in Fig. 1 and substantially the same scale as Fig. 2;

Fig. 4 is an elevational detail, partly in section and with parts broken away and removed, showing a modified form of the series bridging resistor in which the resistive coating is tapered to provide a resistance gradient along the length of the resistor; and Fig. 5 is a graph showing the relation between the electric field gradient and the resistance gradient along the length of the resistor of Fig. 4.

The principles governing the design, operation and connection of the resistor of the present invention are, for purposes of illustration and explanation, embodied in a device for measuring the voltage of a high frequency line, although numerous other uses and applications of the bridging resistor arrangement will readily suggest themselves to those skilled in the art of high frequency electrical transmission equipment. The components of this device are connected across a coaxial high frequency transmission line L, only a short section of such line being illustrated. This line comprises an inner metal conductor 1 in the form of a circular sectioned bar or rod and an outer conductor 2, also of circular section, surrounding the inner conductor in concentric spaced relation thereto. The inner and outer conductors are suitably held in concentric spaced relation as by a tubular insulator 3 of polyethylene or other suitable solid dielectric. The dielectric, which surrounds the inner conductor and supports it within the outer conductor, may be continuous, as shown, or it may compose polyethylene rings spaced along the length of the line. The line L is provided at its ends with conventional coaxial-connectors for connecting the line in high frequency circuits. In the arrangement illustrated diagrammatically the line is connected at one end to a source of high frequency electrical energy such as a signal generator and at the other end to a non-reflecting line termination T.

The outer metal conductor 2 is formed with a suitable, preferably circular, aperture 4 through which extends, in concentric relation, the center conductor assembly of an auxiliary or sampling line S. This assembly includes series connected resistors at least one of which is a resistive element of relatively small physical size disposed across the dielectric space of the line L. A resistor which comprises a carbon or other resistive coating or film 5 deposited on a cylindrical ceramic body 6 is suitable. One end of the ceramic cylinder is received within a hollow metal cup 7 and is secured thereto as by a conductive coated cement or silver paste baked in place which makes positive electrical connection between the resistive film 5 and the metal of the cup body at an annular contact line 13. The cup walls may be axially slotted to provide a spring grip on the end of the resistor rod. The inner conductor 1 of the transmission line is faced or drilled out for attachment thereto of the contact cup 7. A convenient arrangement is one in which the center conductor of the line is drilled, counterbored and tapped to receive the cup in recessed relation so that the junction 13 between the film 5 and the conductive cement or cup rim is substantially flush with the surface of the center conductor 1. A reduced diameter threaded extension 8 formed axially on the cup is screwed into the center conductor. A radial passage 14 is formed in the solid dielectric sleeve 3 to accommodate the resistor R, this opening preferably being sufficiently large to provide an annular clearance 15 completely surrounding the resistor.

The end of the resistor R remote from the center conductor 1 is silvered or otherwise covered by a conductive coating 27 and is secured as by conductive coated cement in a socket in the aligned end of a center rod or conductor 9 of the auxiliary coax S. The end of the ceramic body 6 of the resistor R may be turned or ground down to a reduced diameter, as shown in the Fig. 4 modification, so as to be received and resiliently gripped in telescoped relation within the axially slotted tubular end of the conductor rod 9. This arrangement permits the use of center conductor elements of equal diameter. The resistive film 5 on the ceramic rod 6 is electrically connected at an annular line contact 24 to the metal paint or other conductive band 27 on the resistor rod.

Surrounding the center conductor 9 is the outer conductor of the auxiliary line S, this outer conductor being in the form of a tube or body 10 having a cylindrical bore 11 coaxial to the center rod conductor 9. One end of the conductor body 10, which may be of brass or similar metal, is secured as by solder to the outer conductor 2 of the transmission line L or the parts may be integral. The cylindrical bore 11 coincides with the circular opening 4 in the transmission line conductor.

The auxiliary or sampling coaxial line S is non-reflectively terminated by a coaxial resistor assembly embodying known principles such as referred to and set forth in copending application for patent, Serial No. 692,116, filed August 21, 1946, for High Frequency Co-Axial Device, now Patent 2,552,707. A simplified termination, suitable in the present device because of the relatively low energy absorption requirement, comprises a resistor 16 of the film type and a tapered outer conductor 17. The resistor 16 is a cylindrical ceramic rod having a deposited carbon surface film, the rod being of substantially the same diameter as the center conductor rod 9 and the ceramic rod 6 of the resistor R. One end of the termination resistor 16 is turned or ground to a reduced diameter as indicated at 18 so as to be received and secured in a slotted tubular end portion of the center conductor 9. The arrangement is similar to the construction illustrated and described in connection with the resistor R, the end of the resistor rod having a conductive coating 29 of silver paint or the like that makes electrical connection with the carbon film at an annular line contact 38 and with the conductor rod 9 as by baked-on silver paste and the gripping of the telescoping socket. The other end of the termination resistor is resiliently engaged by the cylindrically disposed ends 19 of a plurality of segmental fingers 20 comprising the tapered outer conductor 17 of the termination. Desirably the end of the resistor 16 is coated with a conductive metal paint as indicated at 21, this paint making direct contact with the inside faces of the finger ends 19 to obtain a good electrical connection between the outer conductor and the carbon film of the resistor 16.

The outer conductor 17 may comprise a turning or machine screw product of brass or similar metal which is formed with a plurality of axial slots 22 extending through the major portion of its length. The general shape of the conductor 17 resembles that of a funnel. The fingers 19 comprise a relatively short cylindrical portion which receives the end of the resistor 16 and the flared portion presents an inside tapered surface 23 of circular section which surrounds the resistor 16 in concentric relation. The maximum diameter of the surface 23 is substantially equal to the diameter of the cylindrical bore 11 in the conductor body 10 and the curvature of the surface, longitudinally, satisfies the principles heretofore enunciated governing such terminations and referred to above. Approximations of the theoretical logarithmic curvature may, of course, be employed, such for example as a straight or conical taper.

The large diameter end of the termination conductor 17 seats against and makes relatively small area contact with a shoulder provided by a counterbore in the end of the conductor body 10 of the auxiliary coax S, the counterbore being aligned with the axis of the bore 11. A hollow plug 25, threaded into a tapping provided in the counterbore, bears against a circumferential flange 26 about the large diameter end of the termination outer conductor 17 to hold the latter firmly against the shoulder at the end of the counterbore. The assembly can be readily rotated to align the center conductor hole 53 with the body passage 40 as will later appear. A non-reflecting side branch, herein identified as the auxiliary line S, has thus been inserted or shunted into the main or transmission line L. Feeding or energizing of the branch line is effected through the bridging resistor R operative over a wide frequency range without objectionable interference in the main line and without objectionable coupling effects. The sample voltage thus obtained in the side or auxiliary line is utilized, for example, in measurement of the main line voltage.

A lateral extension 28 on the conductor body 10 provides a cylindrical chamber that receives capacitors or condensers 30 and 31 of the button type and a resistance element 32. The extension 28 may comprise a tube of brass or similar metal or it may be integral with the line conductor 2 and the auxiliary conductor body 10 or one of them. The resistance 32 is supported centrally in chamber 34 by a tube of solid insulating or dielectric material 33 such as polyethylene. The tubular insulating sleeve 33, in turn, is received in a metal tube 35 that has a snug sliding fit within the extension tube 28. The ends of the tube 35 bear against and make electrical connection with outer rings 36 and 37 of the button capacitors 30 and 31, respectively, the sleeve 33 and the tube 35 being of less length than the chamber in the extension 28 to provide spaces for the condensers.

A passage 40 of circular section extends through the wall of the conductor body 10 between the bore chamber 12 and the chamber within the extension tube 28. This passage is aligned with and coaxial to the extension tube chamber.

Within the passage 40 is supported a crystal rectifier assembly C such as the welded germanium diode G-7 produced by General Electric of Syracuse, New York. This assembly comprises a tubular protective and insulating case or envelope 41 of molded plastic, the ends of the envelope receiving aligned contact elements or rods 47 and 48 sealed in place. A resilient cat whisker wire and a crystal or germanium pellet are respectively attached to the elements 47 and 48 and are thus mounted within the protected interior of the envelope. The crystal or diode assembly is embraced and supported by an insulating sleeve 50 of resilient deformable material such as polyethylene received in the passage 40 as by a press fit, the sleeve serving as a protective mount for the crystal assembly.

The contact element 48 projecting from one end of the crystal assembly is received in a transverse bore or opening 53 of the center rod or conductor 9 of the auxiliary coax. A resilient U-shaped wire 54 is secured by one leg to the conductor rod 9, the other leg of the wire being disposed to bear resiliently against the contact element 48 so as to hold the latter against the wall of the opening 53. The constant pressure of the contact element against the wall of the opening in the center conductor 9 insures positive electrical connection between these components of the measuring circuit.

The contact element 47 of the diode C extends through the opening in center eyelet 51 of the button or charge capacitor 31, the parts being secured together as by solder.

The resistor 32, also called a tap resistor, is, for purpose of assembly, slidable longitudinally in the cylindrical passage 34 of the insulator 33. At its ends short contact wires 55 and 56 project axially from the resistor and are soldered in metal discs 57 and 58 having approximately the same diameter as the axial passage 34 in the insulator. A helical coil compression spring 59 is received in the insulator bore between the disc 57 and the enlarged head portion of a contact element 60 carried by center eyelet 61 of the button by-pass capacitor 30. The spring 59 urges the resistor 32 to the right as viewed in Fig. 1, holding the metal disc 58 in permanent electrical contact against the center eyelet 51 of the button charge capacitor 31.

When high frequency electrical energy is transmitted along the line L, as from a suitable signal generator, the resistor R and the termination resistor 16 of the auxiliary coax S comprise a pair of series bridging resistors which divide between them the transmission line voltage so that such voltage is subject to sampling, the sample obtained being a small but substantially uniform fraction of the transmission line. The line L may extend, say, between a television transmitter and antenna, it may be an intermediate portion of a long transmission line, or, in certain arrangements as, for example, in a test circuit, the transmission line L may be non-reflectively terminated as by the use of a termination T such as disclosed in copending application for patent, Serial No. 777,516 filed October 2, 1947, for High Frequency Electrical Device, now Patent 2,556,642.

High frequency voltage prevailing across the conductors of line L is divided between the series connected resistors R and 16. The division is, for practical purposes, directly proportional to the respective resistances, resistor R being many times greater than the resistance 16 of the termination. Thus the potential across the auxiliary coax or sampling line S is a small but uniform fraction of the potential across the line L, this relationship prevailing over a wide frequency band. It is this relatively low potential that is impressed on the shunt measuring circuit through the crystal assembly C. The resistor R is of sufficiently high resistance, say of the order of about 30,000 ohms, to permit the galvanometer to function as a high resistance voltmeter and to avoid overloading the charge capacitor 31. The crystal, commonly referred to in the trade as a dry point contact rectifier, semi-conductor or converter crystal or crystal diode, operates over a voltage range of from about one-tenth of a volt to about three volts, usually and preferably at about one volt.

The measuring circuit that includes the crystal C may correspond to that described in my copending application for patent Serial No. 116,318, filed September 17, 1949 for Method of and Apparatus for Measuring High Frequency Energy. In that case the crystal circuit is subjected to the voltage sampled by means of a capacitance voltage divider shunted across a coaxial line. In the present invention the voltage sample is obtained in the auxiliary coax S through the series bridging resistors R and 16. The direct current voltage provided by the crystal diode rectifier C charges the capacitor 31, the charge being maintained substantially equal to the peak value of the high frequency voltage prevailing in the auxiliary coax S.

The movable hand or pointer of an instrument G such as a D'Arsonval galvanometer indicates or measures such direct current voltage. The galvanometer is series connected in the crystal circuit and is rated at about thirty micro-amperes full scale when operating at one volt in the present example. One terminal of the instrument or galvanometer is connected to the contact 60 at the center of the by-pass capacitor 30. The other galvanometer contact is connected to the outer conductor or body 10 of the auxiliary coax S. By this arrangement the galvanometer, the crystal assembly C and the resistor 32 are connected in series across the conductors of the auxiliary coax.

The by-pass capacitor 30 performs several useful functions, one of the most important being that it prevents high frequency energy entering the crystal rectifier from outside the coaxial structures, such, for example, as high frequencies that might be picked up externally by the galvanometer circuit. It also isolates the galvanometer from high frequencies prevailing within the coaxial structures. The resistor 32 and the by-pass capacitor 30 function as a resistance-capacitance filter introduced for high frequency attenuation between the charge capacitor 31 and the external galvanometer circuit.

As explained in connection with the corresponding parts in the copending application referred to on the capacitance voltage divider, the time constant of the resistance 32-capacitance 31 combination is sufficiently high to maintain the direct current voltage substantially equal to the peak high frequency voltage across the sampling coax S. This arrangement results in the galvanometer G (suitably calibrated) and the crystal circuit operating in combination as a peak reading diode voltmeter. The charge capacitor 31 is of the order of about thirteen mmf. capacity when used with a tap resistor 32 of about 30,000 ohms resistance. This combination is effective over a frequency range of from about 50 megacycles to about 4,000 megacycles. For use in the lower region of this frequency range, or for still lower frequencies, it is preferable to increase either the capacitance of the charge capacitor 31 or the resistance of the tap resistor 32, or both the resistance and the capacitance to provide a greater time constant. Conversely, for use in the upper region of the frequency range referred to, it is preferable to decrease either the capacitance or the resistance, or both. When the time constant is increased as by an increase in the resistance of the resistor 32, compensation is provided by increasing the sensitivity of the galvanometer G. Over the frequency range normally encountered in practice components having the characteristics referred to have been found satisfactory. In the present structure the resistor 32 is located in close proximity to the charge capacitor, affording a dimensionally short connection therebetween. Discharge capacitance and inductance effects are thus minimized.

The action of the crystal C and the circuit elements associated therewith is to produce in the galvanometer G a small direct current proportional to the high frequency voltage across the transmission line L. By suitable calibration of its dial the galvanometer G thus indicates directly the high frequency voltage or power of a suitably terminated transmission line.

For use in other types of instruments or circuits, or with similar instruments of different structure and geometry, the bridging resistor of the present invention can be used over a much wider frequency range than indicated above in connection with the illustrative example.

During the transmission of high frequency electric energy or current along the line L, an electric or electrostatic field prevails in or across the annular dielectric space between the inner conductor 1 and the outer conductor 2. The bridging resistor is so positioned in radial relation to the center conductor 1 of the line that the resistive film 5 is subjected to the electrical field referred to. By reason of the drop in voltage along the length of the resistor R, such resistor being bridged or series connected across the line L in the manner previously described, the voltage at different points along the length of the bridging resistor approximates the voltage prevailing in the adjacent portions of the electric field between the conductors of the line.

Along the length of the bridging resistor R, reactive coupling is substantially neutralized—the resistive coupling producing a potential at each point which is substantially the equivalent of the capacitive coupling at such point. Accordingly, capacitive coupling does not objectionably influence the voltage or current in the auxiliary coax S and in the sampling circuit.

The bridging resistor, located in radial relation to the coaxial line, has no effective component parallel to the longitudinal axis of the line section. That is, the longitudinal axis of the bridging resistor, which is normal or at right angles to the line axis, has no component parallel to the line. Thus the magnetic field of the line is not inductively coupled to the bridging resistor. Current flowing in the line does not objectionably influence the potentials present on the bridging resistor or the current flow in the circuit of the bridging resistor through the magnetic field. Accordingly, the device is not sensitive to current flow on the line or to magnetic fields of the line which result from such current.

The juncture or contact line 24 between the coating 5 of the resistor R and the center conductor of the auxiliary coax S is located at or closely adjacent that point within the electrical field of the transmission line L where the difference in potential between such point and the outer conductor 2 of the line is substantially equivalent to the voltage or potential across the auxiliary coax S. The juncture line 24 may be positioned within inside diameter *b* of the outer conductor 2 of the transmission line. A distortion in the high frequency field results from the opening 4 through the outer conductor so that, for practical purposes, it is satisfactory if such junction line be located at or even slightly beyond the diameter of the internal surface of the outer line conductor 2.

In accordance with accepted theory, the electric or electrostatic field in the annular space surrounding the center conductor 1 of the transmission line L, while uniform or substantially so circumferentially, is characterized by a radial voltage gradient which is of non uniform character. While, for most applications, a bridging resistor R having a uniform resistance per unit of length is satisfactory, it is preferable for certain uses to provide a bridging resistor having a tapered resistance, or a resistor structure effective as a tapered resistance, matching the voltage gradient in the dielectric between the line conductors.

In a bridging resistor having a tapered resistance, such, for example, as is illustrated diagrammatically in Fig. 4, the incremental resistance or resistance per unit length axially along the resistor varies as the characteristics of the electrostatic field in which the resistor is located. The intensity of the electrostatic field varies inversely as the distance from the center axis 66 of the line increases. It is therefore contemplated, pursuant to the present invention, that the resistance per unit length of the resistor R also decreases proportionally per unit of length progressively away from the longitudinal axis of the transmission line coax.

A non-uniform resistance gradient along the length of the resistor structure R is obtained by depositing thereon, for example, a carbon film 65 that varies in thickness. The film is deposited at a slower rate at one end (the inner end adjacent the center line conductor 1) than at the other end, or for a shorter period of time at one end (the inner end) than at the other end so that the film at such other end adjacent the outer conductor of the line is built up to a greater thickness. Between the two ends of the resistor the carbon film is of tapered thickness or is graded in steps so that the incremental resistance or resistance per unit length varies progressively along the length of the ceramic rod. Satisfactory results are also obtained when the resistance gradient is provided by first depositing a resistive coating of, say, uniform character along the length of the ceramic rod and then removing a portion, or portions of the coating as by buffing. The buffing or removing is done in stages or steps and the resistor rod is tested from time to time by known methods to determine the extent of removal required and the location or area of removal to provide the desired gradient.

In making the resistor by varying the rate or duration of the carbon depositing process at different points along the length of the rod (or ceramic tube if a tube be employed), such process is preferably performed in stages or steps with testing of the resistor between steps to determine the extent to which different portions of the structure must be subjected to additional or further carbon depositing in order to obtain the desired resistance gradient or gradients.

The resistive film on the ceramic rod 6 is extremely thin, preferably being of microscopic thickness to avoid objectionable skin effects. Thus the difference between a bridging resistor embodying a resistive film of uniform character is not ordinarily distinguishable without suitable instruments from a resistor having a tapered or stepped film providing the theoretically desirable tapered resistance mentioned above. In Fig. 4 the thickness of resistive film 65 is greatly exaggerated to illustrate the tapered resistance principle, the other components of this modified arrangement being the same as in the preceding figures and being indicated by the same numerals of reference. The film is shown to be of greater thickness (less resistance per unit length) at the outer end of the resistor adjacent the junction line 24 where electrical connection is made with the conductive metal paint or coating that extends onto the center conductor 9 of the auxiliary coax S than at the other or inner end of the resistor which is received in and electrically connected at junction line 13 to the cup 7 for attachment to the center conductor 1 of the transmission line. Between the inner junction line 13 and the outer junction line 24 the resistive film 65 tapers in thickness (and in resistance per unit length) in proportional relation to the electrical field intensity or voltage gradient of the coaxial line L.

The electric and magnetic field intensities within the coaxial transmission line decrease inversely with radial distance from the axis of the line. The electrostatic field at any point in the dielectric medium of a coaxial transmission line is represented by the known equation:

$$E = \frac{V}{r \ln \frac{b}{a}}$$

in which E represents the intensity of the electric field at such point in volts per meter; V represents the voltage across the line conductors; r represents the distance in meters from the point to the longitudinal center axis of the line, and b and a are respectively the inside diameter in meters of the outer conductor and the outer diameter in meters of the inner conductor of the line. In solving for E to obtain the voltage gradient as a function of radial distance within the dielectric of any line the above equation can be simplified to:

$$E = \frac{K}{r}$$

in which K is a constant for any given voltage and line geometry.

Fig. 5 is a graphic illustration of the electric field intensity or voltage or potential gradient in the dielectric of the line and also of the theoretically desired distribution of the resistance along the length of the resistor R. In this graph radial distances from the longitudinal axis of the line L, such axis being indicated at 66, are taken along the abscissa, the greatest distance being one-half the inside diameter of the outer conductor 2, or b/2. The ordinates represent relative voltage gradient as derived from the above equation and resistance as measured between the inner end of the resistor, say at the contact line 13, and points along the length of the resistive film. In accordance with the principles of the present invention the resistance gradient along the resistor length conforms to the relative voltage gradient of the surrounding electric field so that the voltage gradient curve of Fig. 5 also represents the desired relative resistance gradient per unit length of the film 65.

The integral of the voltage gradient curve represents the resistance of the resistor R between the circular line contact 13 and the points along the length of such resistor, such information being useful in making the graduated or non-uniform tapered resistors of the present invention by known methods. The length of the resistor corresponds to the radial distance between the circular contact lines 13 and 24, previously mentioned, the relative positions of these lines being indicated on the graph. The total or overall resistance of the resistor R is the required or design resistance for use in the particular circuit contemplated. In Fig. 5, the resistance curve, which is the integral of the voltage gradient curve, thus represents the resistance between any point along the length of the resistor and the center conductor.

The theoretical considerations described have reference to a mechanically pure resistance such as a self-supporting body in the form of a thin film or rod. In practice, however, it is not feasible to construct a mechanically pure resistance having the other characteristics necessary. Support means for the thin resistive film in the form of the ceramic rod 6 employed for this purpose, introduces a dielectric into the electric field having a dielectric constant differing from and usually higher than that of the medium surrounding the rod. Thus, although the resistance along the resistor R is, in theory, preferably tapered in proportional relation to the gradient of the electric field between the conductors, the gradient of the resistance is in practice suitably modified to compensate for the distributed capacitive effect along the length of the rod 6 resulting from the higher dielectric constant of the rod 6.

For practical purposes the resistance gradient of the film resistor, which in the case of a mechanically pure or formless resistor would theoretically be proportional to the electric field intensity, may be so modified as to make the change in resistance per unit length very slight. For use in measuring instruments and reflectometers, bridging resistors having substantially uniform resistance per unit length have been found satisfactory. The supporting dielectric rod 6 may, of course, be of greatly reduced diameter and may take the form of a thin filament or rod of quartz or similar material capable of supporting the resistive film 5 or 65 and of being suitably connected and supported at its ends.

This invention provides a means of realizing high values of pure resistance at high frequencies. By "high values" is meant resistance values several times the characteristic impedance of the usual coaxial lines, or from about 200 ohms upward in present practice. The troubles usually experienced with high resistances at high frequencies may be explained by realizing that distributed capacitances are present, together with residual capacitances between the terminals and that the capacitive reactances in parallel with the presumed pure resistance soon become lower than the resistance value as frequency increases, this making the true terminal-to-terminal impedance entirely different from the resistance presumed.

It can be said that this invention circumvents or eliminates distributed capacitance by placing a distributed length of resistive film parallel to the electrostatic field lines across a coaxial line. The film being of high specific resistance and neglecting the higher dielectric constant of the film-supporting ceramic rod, it is seen that the electrostatic field is substantially the same with or without the resistor. Currents flow normally through the distributed capacitance of the coaxial line, but distributed capacitance currents do not flow outward from or perpendicular to the film surface because the electrostatic field lines do not act in this perpendicular direction. Distributed capacitance is thus negligible in the device or combination of the present invention.

From another viewpoint the principle underlying the design is the provision of an effective resistive drop along each element of the length of the resistor to match the intensity of the electric field. Hence, the resistive drop in voltage along the length of the resistor matches the surrounding electric field distribution and the bridging resistor is substantially free of distributed capacitance effects.

The resistor R, matched in the manner described to the electric field in which it is radially disposed, functions at the very high frequencies for which coaxial transmission lines are designed in much the same manner and with substantially the same electrical effect as at very low frequencies.

In accordance with the patent statutes the principles of the present invention may be utilized in various ways, numerous modifications and alterations being contemplated, substitution of parts and changes in construction being resorted to as desired, it being understood that the devices shown in the drawings and described above and the particular methods set forth are given merely for purposes of explanation and illustration without intending to limit the scope of the claims to the specific details disclosed.

What I claim and desire to secure by Letters Patent of the United States is:

1. In combination in a high frequency electrical circuit, a line comprising conductor means providing when charged a graded electrostatic field corresponding to the potential of the circuit, and a film resistor connected in bridging relation to the conductor means and extending across the field, the resistance of the resistor from the connection thereof to the conductor means to any point of the film resistor being distributed over the resistor so as to provide at such point an electrical potential substantially equivalent to the electrostatic field at such point.

2. In combination in a high frequency electrical circuit, a line comprising an inner conductor and a tubular outer conductor arranged in spaced coaxial relation and providing when energized a graded high frequency electrical field in the space between the conductors, and a bridging circuit connected across the conductors, said bridging circuit including a film resistor extending across the space between the conductors and connected at one end to the inner conductor, the resistance of that portion of the film resistor between the connection thereof to the inner conductor and any point along the length of the film resistor being distributed over the resistor so as to provide at such point of the film resistor an electrical potential substantially equivalent to the electrostatic field at such point.

3. In combination in a high frequency electrical circuit, a line comprising an inner conductor and a tubular outer conductor arranged in spaced coaxial relation and providing when energized a graded high frequency electrical field surrounding the inner conductor in the space between the conductors, and a bridging circuit connected across the conductors, said bridging circuit including an elongated rod-like insulator having deposited thereon a film resistor extending across the space between the conductors and connected at one end to the inner conductor, the resistance of that portion of the film resistor between the connection thereof to the inner conductor at any point along the length of the film resistor being distributed over the resistor so as to provide at such point of the film resistor an electrical potential substantially equivalent to the electrostatic field at such point.

4. In combination with a high frequency transmission line comprising spaced conductors, a voltage sampler comprising a resistor disposed across the electrostatic field of the line and connected at one end to a conductor of the line, said resistor providing a resistance gradient along its length from said end substantially proportional to the voltage gradient of the electrostatic field, and means having connection with the other end of the resistor and another conductor of the transmission line responsive to energy transmitted by the resistor.

5. In combination with a coaxial high frequency transmission line having spaced inner and outer conductors, a voltage sampler comprising a resistor disposed across the space between the conductors in the electrostatic field of the line and connected at one end to the inner conductor, said resistor having a resistance along its length substantially proportioned to the voltage gradient of the electrostatic field, and means having connection with the other end of the resistor and the outer conductor of the coaxial line responsive to energy transmitted by the resistor.

6. A branch line structure for use in combination with a high frequency electrical transmission line comprising conductor means which upon being energized provides an electric field graded in intensity, said branch line comprising conductor means electrically connected to the conductor means of the transmission line and including a film resistor disposed across the graded electric field, said film resistor having a resistance gradient substantially proportional to the voltage gradient of the electrostatic field of the conductor means of the transmission line, being only of substantially microscopic thickness in a direction transverse to the electrostatic lines of said field and being characterized by a substantially complete absence of distributed capacitance effects along its length.

7. In combination in a high freqeuncy coaxial electrical system, a coaxial transmission line having an inner and a tubular outer conductor, an auxiliary coaxial line having an outer conductor connected to one of the conductors of the transmission line and inner conductor means, the inner conductor means of the auxiliary line including series connected resistors one of which is elongated and extends radially through the dielectric separating the line conductors, the said one resistor being disposed wholly in a narrow portion of the line cross section and connected to the other conductor of the transmission line, another of the series connected resistors being connected to the outer conductor of the auxiliary line remote from the transmission line, and coaxial means comprising inner and outer conductors connected to the auxiliary line, the inner conductor of the last named coaxial means being connected to the inner conductor of the auxiliary line intermediate the resistors.

8. In combination a coaxial high frequency transmission line having an outer tubular conductor and an inner conductor together defining a given characteristic impedance, and a bridging system comprising an auxiliary coaxial line, having an outer tubular conductor and an inner conductor terminated to carry only a small portion of the voltage of said transmission line, a connection from one conductor of the transmission line at an intermediate point therein to the outer conductor of the auxiliary line, an aperture in said one conductor at said point, and a resistor connecting the other conductor of the transmission line to the inner conductor of the auxiliary line through said aperture, said resistor being insensitive to frequency and having a value several times greater than said characteristic impedance and being proportioned in length to extend from said other conductor of said transmission line to the point where the radial electric field intensity of said transmission line becomes substantially equal to the potential of the inner conductor of said auxiliary line.

9. In combination a coaxial high frequency transmission line having an outer tubular conductor and an inner conductor together defining a given characteristic impedance, and a bridging system comprising an auxiliary coaxial line having an outer tubular conductor and an inner conductor terminated to carry only a small portion of the voltage of said transmission line, the outer conductor of the auxiliary line being connected to one of the conductors of the transmission line about an aperture at an intermediate point therein, and a resistor connecting the other conductor of the transmission line to the inner conductor of the auxiliary line through said aperture, said resistor being insensitive to frequency and having a value several times greater than said characteristic impedance and being of tubular form to occupy only a narrow sector of the cross section of said transmission line and being proportioned in length to extend radially from said other conductor of said transmission line to the point where the radial electric field intensity of said transmission line becomes substantially equal to the potential of the inner conductor of said auxiliary line, the inner conductor of said auxiliary line being extended to meet the end of said resistor at said point.

10. In combination a coaxial high frequency transmission line having an outer tubular conductor and an inner conductor together defining a given characteristic impedance, and a bridging system comprising an auxiliary coaxial line having an outer tubular conductor and an inner conductor and a reflectionless termination at the end thereof, the outer conductor of the auxiliary line being connected to one of the conductors of the transmission line about an aperture at an intermediate point therein, and a resistor connecting the other conductor of the transmission line to the inner conductor of the auxiliary line through said aperture, said resistor being a thin film of tubular form insensitive to frequency and having a value several times greater than said characteristic impedance and being physically proportioned to occupy a narrow sector of the cross section of said transmission line and to extend radially from said other conductor of said transmission line to the point where the radial electric field intensity of said transmission line becomes substantially equal to the potential of the inner conductor of said auxiliary line.

11. In combination a coaxial high frequency transmission line having an outer tubular conductor and an inner conductor together defining a given characteristic impedance, and a voltage measuring system comprising an auxiliary coaxial line having an outer tubular conductor and an inner conductor and a reflectionless termination at the end thereof, the outer conductor of the auxiliary line being connected to one of the conductors of the transmission line about an aperture at an intermediate point therein, and a coupling resistor connecting the other conductor of the transmission line to the inner conductor of the auxiliary line through said aperture, said resistor being insensitive to frequency and having a value several times greater than said characteristic impedance and being of tubular form to occupy only a narrow sector of the cross section of said transmission line and being proportioned in length to extend radially from said other conductor of said transmission line to the point where the radial electric field intensity of said transmission line becomes substantially equal to the potential of the inner conductor of said auxiliary line, and a measuring circuit including a current indicator and a crystal rectifier connected in series and shunted across said auxiliary line at a point intermediate its coupling resistor and its reflectionless termination.

12. In combination a coaxial high frequency transmission line having an outer tubular conductor and an inner conductor together defining a given characteristic impedance, and a bridging system comprising an auxiliary coaxial line having an outer tubular conductor and an inner conductor terminated to carry only a small portion of said transmission line, the outer conductor of the auxiliary line being connected to the outer conductor of the transmission line about an aperture at an intermediate point therein, and a resistor connecting the inner conductors of said lines through said aperture, said resistor being insensitive to frequency and having a value several times greater than said characteristic impedance and being proportioned in length to extend from the inner conductor of said transmission line to the point where the radial electric field intensity of said transmission line becomes substantially equal to the potential of the inner conductor of said auxiliary line.

References Cited in the file of this patent

UNITED STATES PATENTS

| | | |
|---|---|---|
| 2,030,180 | Potter | Feb. 11, 1936 |
| 2,273,547 | Von Radinger | Feb. 17, 1942 |
| 2,423,506 | Landon | July 8, 1947 |
| 2,434,560 | Gunter | Jan. 13, 1948 |
| 2,438,915 | Hansen | Apr. 6, 1948 |
| 2,474,794 | Van Beuren | June 28, 1949 |
| 2,521,828 | Chatterton et al. | Sept. 12, 1950 |
| 2,524,183 | Wheeler | Oct. 3, 1950 |
| 2,526,846 | Bowman | Oct. 24, 1950 |
| 2,667,622 | Weber et al. | Jan. 26, 1954 |

FOREIGN PATENTS

| | | |
|---|---|---|
| 614,005 | Great Britain | Dec. 8, 1948 |